United States Patent [19]

Barnes

[11] Patent Number: 4,610,263

[45] Date of Patent: Sep. 9, 1986

[54] PNEUMATIC SERVO ASSEMBLY FOR AN ELECTRO PNEUMATIC CONVERTER

[75] Inventor: Christine B. Barnes, Wickliffe, Ohio

[73] Assignee: The Babcock & Wilcox Company, New Orleans, La.

[21] Appl. No.: 751,463

[22] Filed: Jul. 2, 1985

Related U.S. Application Data

[63] Continuation of Ser. No. 469,200, Feb. 24, 1983, abandoned.

[51] Int. Cl.[4] ............................................. G05D 16/00
[52] U.S. Cl. ........................................ 137/85; 137/82
[58] Field of Search .................... 137/83, 84, 85, 86; 91/3

[56] References Cited

U.S. PATENT DOCUMENTS

| | | | |
|---|---|---|---|
| 2,776,669 | 1/1957 | Gorrie | 137/86 |
| 4,112,960 | 9/1978 | Hermanns | 137/85 |
| 4,172,464 | 10/1979 | Rezendes | 137/85 |
| 4,388,942 | 6/1983 | Mito | 137/85 |

Primary Examiner—Alan Cohan
Attorney, Agent, or Firm—Vytas R. Matas; Robert J. Edwards

[57] ABSTRACT

A pneumatic servo assembly (20) is provided for an electro-pneumatic control system (10) having closed loop control of a D.C. motor (12) operated from an error signal (56) developed from an electrical set point signal (4) and a pneumatic feedback signal (44). The feedback signal (44) is made compatible by a pressure transducer (26) monitoring the pressure output signal (22) of the pneumatic servo assembly (20) and establishing an electrical signal indicative thereof which is scaled, zeroed, and amplified by an amplifier unit (46).

6 Claims, 6 Drawing Figures

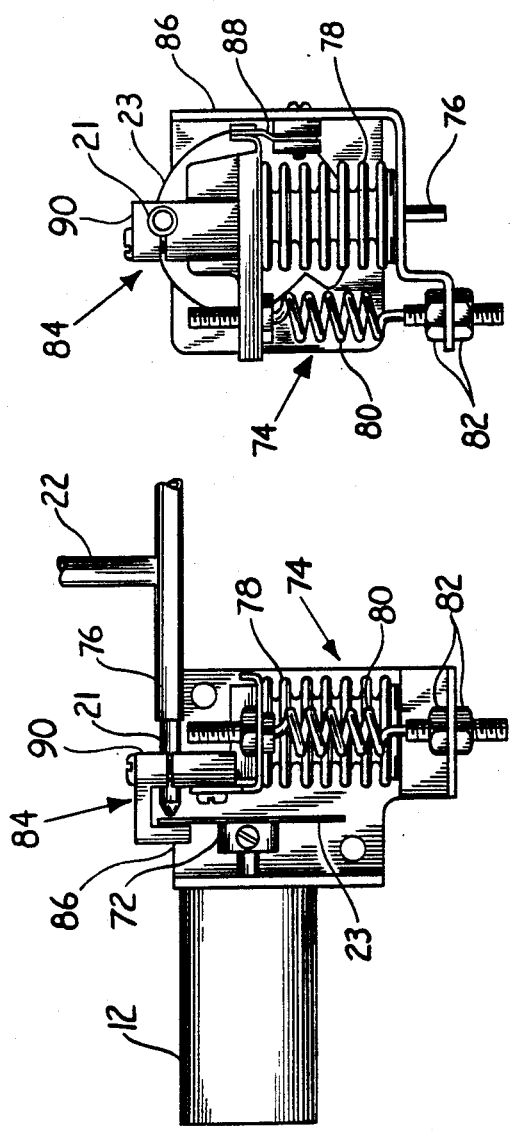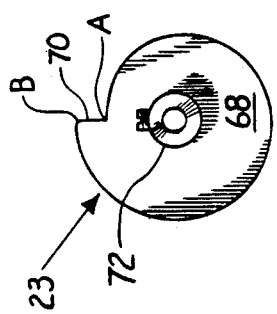

PNEUMATIC SERVO ASSEMBLY FOR AN ELECTRO PNEUMATIC CONVERTER

This application is a continuation of application Ser. No. 469,200 filed Feb. 24, 1983 now abandoned.

TECHNICAL FIELD

The present invention relates to control systems for electro-pneumatic converters in general and particularly to pneumatic servo assemblies for such control systems utilizing a variable restriction cam and backpressure nozzle feeding an output bellows which also provides a feedback signal to the control system.

BACKGROUND ART

Control systems for electro-pneumatic converters are known. Usually a 4 to 20 milliamp electrical signal is used to actuate a solenoid-like motor. The 4 to 20 milliamp electrical signal causes a proportionate displacement in the spring-loaded core of the solenoid-like motor which displacement is used to control the restriction of an associated pneumatic valve producing a pressure change proportional to the motion of the core. An example of such a device may be found in U.S. Pat. No. 3,334,642 issued Aug. 8, 1967 to P. G. Borthwick.

There are certain disadvantages to the pneumatic servo assemblies of such electro-pneumatic control systems. Firstly, they are unable to hold positions on loss of power. Should power be removed from the coil, the core moves back to a position where it is in equilibrium with its associated spring. This causes the pneumatic output signal to go off scale, resulting in the movement of control devices actuated by the electropneumatic system to either the fully-opened or fully-closed positions which may be catastrophic under certain circumstances. Secondly, such pneumatic servo assemblies are vibration sensitive. Since the cores are suspended from springs which act as range and zero limiters, vibration of the core causes a variation in the pneumatic output signal. Also, there usually is no feedback signal of the pneumatic output signal to the input of the control systems.

SUMMARY OF THE INVENTION

The present invention overcomes these problems of known electro-pneumatic control systems as well as others by providing a pneumatic servo assembly for such systems which is dependent upon an electrically-driven D.C. motor to provide a variable restriction to a pneumatic nozzle, thereby providing a fail-safe device which will maintain the last electrical signal to the pneumatic assembly upon a loss of electrical power since the motor will stop in its last driven position.

The pneumatic servo assembly of the present invention utilizes a D.C. motor-driven cam member to provide a variable restriction to a pneumatic backpressure nozzle thus allowing the nozzle to supply a spring-loaded bellows assembly which produqes a 3 to 15 psi pneumatic output signal also providing a feedback signal to the electrical input signal.

The feedback signal is used to produce an error signal between a set point signal determined by the 4 to 20 milliamp electrical input and the feedback signal of the pneumatic output as sensed by a pressure transducer changing this pneumatic feedback signal to an electrically-equivalent signal.

Thus, one object of the present invention is to provide a pneumatic assembly for an electro-pneumatic control system which will maintain the last pneumatic output upon a loss of electric power.

Another object of the present invention is to provide a pneumatic assembly for an electro-pneumatic control system which is insensitive to vibration of the pneumatic assembly.

Yet another object of the present invention is to provide a pneumatic assembly for an electro-pneumatic control system which provides a feedback signal to the electronic part of the control system producing an error signal driving the restriction of the pneumatic assembly.

These and other objects of the present invention will be more clearly understood from a review of the following detailed description of the invention when considered with the accompanying drawings.

BRIEF DESCRIPTION OF THE DRAWINGS

FIG. 3 is a detailed side view of the bellows and spring assembly of FIG. 2.

FIG. 4 is a detailed end view of the FIG. 3 bellows and spring assembly.

FIG. 5 is a detailed end view of the cam assembly 23 of FIG. 2.

DESCRIPTION OF THE PREFERRED EMBODIMENT

Figure 1:
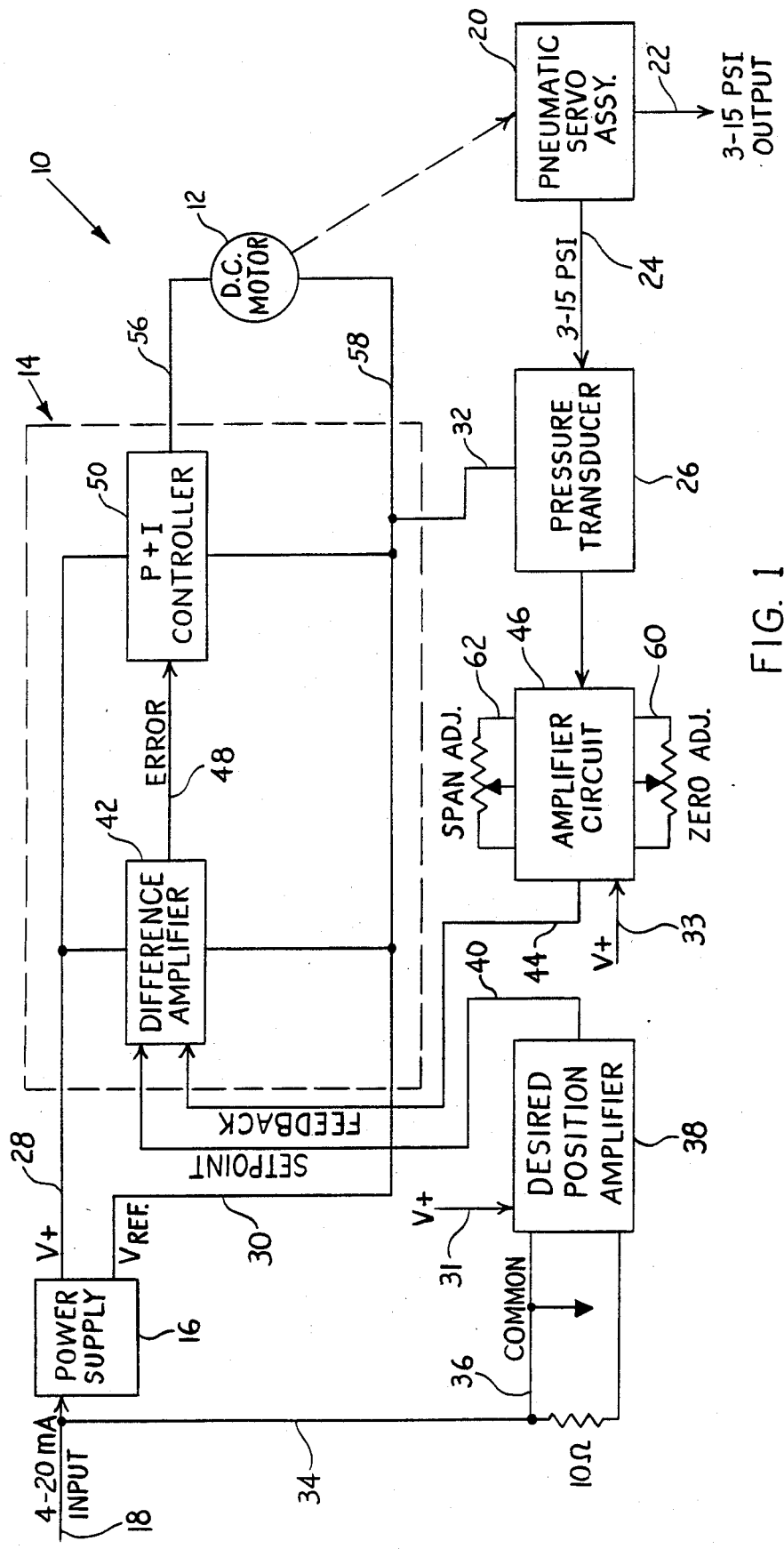
FIG. 1 is a functional block diagram of the control system of the present invention.
Figure 1A:
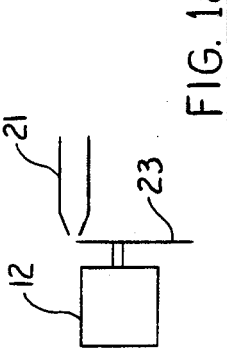
FIG. 1a is an expanded view of the motor-driven cam and backpressure nozzle of the mechanizal servo assembly of FIG. 1.

Referring now to the drawings wherein the showings are made for purposes of illustrating the preferred embodiment of the present invention and are not intended to limit the invention thereto FIGS. 1 and 1a show an electro-pneumatic control system 10 wherein a D.C. motor 12 is controlled by an electronically-controlled motor servo circuit 14 which is powered by a power supply 16 operated from a 4 to 20 milliamp input control signal connected to the power supply 16 along line 18. The D.C. motor 12 is mechanically constrained to a pneumatic servo assembly 20 which has a backpressure nozzle 21 variably restricted by a cam assembly 23 connected to and driven by the D.C. motor 12 to thus provide a variable backpressure output along output line 22 of the pneumatic servo assembly 20 normally in the 3 to 15 psi output range. This 3 to 15 psi output is linear and corresponds to the linear 4 to 20 milliamp electrical input provided along input line 18. This same 3 to 15 psi output is also sent along line 24 to a pressure transducer 26 which provides a feedback signal used in determining control of the D.C. motor 12 as will be described more fully later.

To allow the D.C. motor 12 to be operated bi-directionally without the need for dual polarity voltages, the power supply 16 establishes dual voltages V+ and $V_{ref}$ along power lines 28 and 30 respectively. The V+ voltage is in the range of 6.4 volts nominal and powers the motor servo circuit 14 as well as a desired position amplifier 38 and an amplifier circuit 46 along input lines 31 and 33 respectively. The $V_{ref}$ portion of power supply 16 is transmitted along line 30 to bias up the motor servo circuitry 14 and power the pressure transducer 26 along line 32.

To establish the set point from the 4 to 20 milliamp input signal to which the appropriate 3 to 15 psi output will have to be supplied from output line 22, the particular electrical input signal is sent along line 34 to a 10 ohm precision resistor located between the circuit common at line 36 and the input to a position amplifier 38. The precision 10 ohm resistor senses the particular current level and establishes a voltage drop across itself with that voltage drop providing the counterpart voltage input to the position amplifier 38. The position amplifier 38 raises the input signal level to a predetermined level and sends this along line 40 as a set point signal to a difference amplifier 42 compatible with the level of the feedback signal also provided to the difference amplifier 42. The difference amplifier 42 is the first stage of the motor servo circuit 14. The second input to the difference amplifier 42 is the feedback signal provided along line 44 from amplifier circuit 46 which scales and zeroes the pressure signal provided by pressure transducer 26 which acts as the pneumatic-to-electric converter for the 3 to 15 psi output signal established at output line 22.

The difference amplifier 42 senses any deviation of the feedback signal from line 44 to the established set point signal 40 and establishes an error signal along line 48 which is an amplified difference signal so long as such difference between set point and feedback is maintained. This amplified error signal is inputed into a proportional and integral controller 50 where it is integrated and scaled up or down with respect to $V_{ref}$.

Thus bi-directional rotation of the motor 12 is achieved by the voltage output of the proportional plus integral controller 50 rising or falling below the voltage reference $V_{ref}$. When the output signal is above voltage reference $V_{ref}$, the current through the motor 12 will drive the motor 12 in a first rotational direction. When the voltage output of the proportional plus integral controller 50 is equal to $V_{ref}$, no current flows through the motor and the motor is stationary. If the output voltage drops below $V_{ref}$, the rotation of the motor 12 will reverse to a second rotational direction due to the voltage level applied to it crossing the $V_{ref}$ point.

Turning back now with particular reference to FIG. 1, the amplifier circuit 46 has both a zero adjustment 60 and a span adjustment 62. The zero and span adjustment allows the feedback signal to be adjusted to respond over a variety of ranges. The predominant pressure range and pressure starting or zero point that the feedback will be adjusted for is the 3 to 15 psi signal which is the standard for pneumatic instrumentation as 4 to 20 milliamp is the standard for electrical instrumentation. Other ranges are also available and may be set, including any 50 percent split range desired (i.e., 0 percent is 3 psi, 100 percent is 9 psi).

Should an electrical failure occur in the system 10, the D.C. motor 12 would stop with the cam 23 remaining in its last position to provide the same backpressure restriction from the nozzle 21 to the pneumatic servo assembly 20 and the last conforming pressure output signal would be maintained along output line 22 by the pneumatic servo assembly 20.

Figure 2:
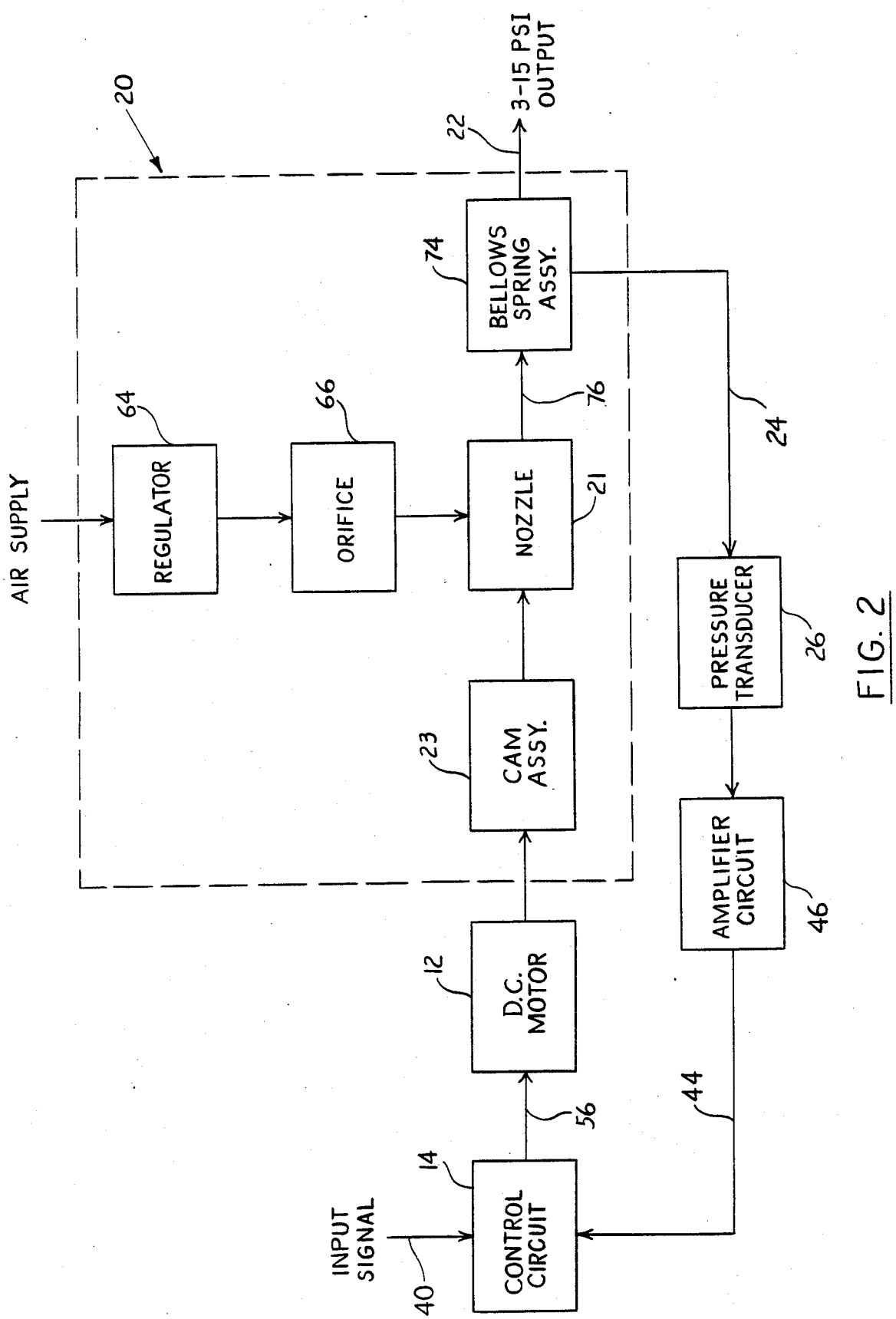
FIG. 2 is a functional block diagram of the pneumatic servo assembly of the FIG. 1 control system.

Referring now to FIG. 2, the pneumatic servo mechanism 20 is seen to include a regulator 64 which is connected to an air supply of unregulated high pressure air and acts to reduce the air supply pressure to a constant clean, low pressure of 22±2 psi. The filtered and regulated air from regulator 64 is piped to the backpressure nozzle 21 by way of an orifice 66. As is known to those in the pneumatic control arts area, the size of the orifice 66, in conjunction with the opening of the backpressure nozzle 21, act to determine the air consumption as well as response time of the pneumatic servo mechanism 20.

As was previously described, the motor servo assembly 14 causes the D.C. motor 12 to be rotated in either a clockwise or counterclockwise direction which direction is dictated by a comparison of the set point and the feedback signals inputed to the control circuit 14 which acts to thus control the D.C. motor 12. The rotation of the motor 12 causes the cam assembly 23, which may be best seen at FIG. 5, to rotate with respect to the backpressure nozzle 21 causing a relative blockage or opening of the backpressure nozzle 21.

With particular reference to FIG. 5, it will be seen that the cam assembly 23, shown as the typical 3 to 15 psi output cam assembly 23, is formed as a spiral-generated plane 68 having a notched portion 70 with a hub 72 located in the center of the spiral plane section 68. The spiral is formed to produce a linear function pressure output from output line 22 from the backpressure nozzle 21. By way of example, when the nozzle, which will always seek the edge of the plane 68 aligned therewith, is positioned with point A, a 3 psi output will be produced. Similarly, at point B, a 15 psi output will be produced. Angularly linear outputs will be produced between points A and B. Thus, the height of the notch 70 is the range of the output signal. The hub 72 is used to mount the cam assembly 23 to the shaft of the D.C. motor. Turning next to FIGS. 2 through 4, it will be seen that restricting the backpressure nozzle 21 causes an increase in backpressure which is piped to the bellows spring assembly 74 through line 76. There is a directly-proportional relationship between the pressure in the bellows spring assembly 74 and the height to which it will expand. This is determined by the construction of the bellows 78 as well as the spring 80 which is mounted in parallel with the bellows 78. The spring 80 acts to limit the motion of the bellows 78, thereby limiting the output range of the pneumatic output signal along line 22 to a desired range which is determinable by adjusting the spring pressure of the spring 80 by either extending or loosening the spring 80 and setting it in that particular position by way of adjusting nuts 82. Thus, nuts 82 may be used to provide fine adjustment to the particular output pressure range desired. Should a different pressure range be desired, such as a 3 to 27 psi, a different spring 80 having a different spring coefficient may be replaced.

With particular reference to FIGS. 3 and 4, it will be seen that the backpressure nozzle 21 is rigidly-mounted to a bracket assembly 84 to which the bellows 78 and the spring 80 are also mounted. The bracket assembly 84 is then mounted to a stationary frame member 86 through a hinge 88 to thus allow rotational motion of the backpressure nozzle 21 and the bellows 78 and spring 80 around the pivot point 88.

This mounting of the backpressure nozzle 21, bellows 78, and spring 80 as a single unit makes the pneumatic servo assembly impervious to vibration induced errors by allowing the entire assembly to move as a single unit in response to any vibration induced by external sources into the pneumatic servo assembly 20.

In operation, it will be seen that as the motor 12 and cam assembly 23 rotate to variably restrict the backpressure nozzle 21, the bellows 78 will expand causing a pivoting of the previously-mentioned assembly around pivot point 88 until the backpressure nozzle 21 reaches a position along the edge of the cam plane surface 68 producing a backpressure feedback signal which will balance the set point signal and stop the rotation of the motor 12 and cam assembly 23. This will result in an output pressure signal along line 22 which is proportional to the electrical input signal which originally had caused the D.C. motor 12 to rotate.

As may be seen, there is no mechanical contact between the backpressure nozzle 21 and the cam assembly 23. Therefore, the D.C. motor 12 need only overcome its own internal friction to rotate along with a small amount of drag on the cam assembly 23 which may be caused by the nozzle clamp 90. The nozzle clamp 90 rides on the cam assembly 23 loading it away from the motor 12 to thus take up any end play in the shaft of the motor 12. This force is minimal and there are no forces developed which will turn the motor 12 off. If the motor 12 and the cam assembly 23 do not turn clearly the backpressure output along line 22 will not change.

Certain modifications and improvements will occur to those skilled in the art upon reading the foregoing Specification. It will be understood that all such improvements and modifications are deleted herein for the sake of conciseness and readability but are properly intended to be within the scope of the following claims.

I claim:

1. A pneumatic servo assembly for an electropneumatic control system comprising:
   a pneumatic backpressure nozzle for providing a pneumatic output signal;
   a cam shaped movable input restriction for variably blocking the output of said nozzle at substantially the same linear distance therefrom;
   electric motor means coupled by a shaft to said cam shaped movable input restriction for rotating said cam shaped movable restriction with respect to said nozzle to variable block said nozzle thereby including a nozzle clamp for eliminating end play in the shaft to maintain a substantially constant distance between said nozzle and said cam shaped restriction;
   a bellows assembly connected to said nozzle to expand and contract in response to the pressure from said nozzle; and
   said backpressure nozzle and said bellows assembly being attached as a unit to a single pivot point allowing the rotation of both as a unit around said pivot point in response to bellows expansion or contraction.

2. A pneumatic servo assembly as set forth in claim 1 wherein said nozzle clamp is formed as a single member having one end mounted to said backpressure nozzle with the opposite end in contact with said cam shaped movable restriction on the side opposite said backpressure nozzle thereby taking up any end play in the shaft of said electric motor means.

3. A pneumatic servo assembly as set forth in claim 1 wherein said bellows assembly includes an adjustable spring connected in parallel with the bellows to adjust the output from the bellows assembly.

4. A pneumatic servo assembly as set forth in claim 3 wherein said backpressure nozzle is rigidly attached to said bellows assembly to move simultaneously with said bellows assembly.

5. A pneumatic servo assembly as set forth in claim 3 wherein said motor means is a D.C. motor having a cam assembly connected thereto for variably restricting the pneumatic servo assembly depending upon the position of said cam.

6. A pneumatic servo assembly as set forth in claim 5 wherein said cam assembly is a flat, substantially spiral-generated plane having a spiral generating center mounted hub for mounting the cam assembly to said motor means.

* * * * *